United States Patent
Chun

(10) Patent No.: US 9,177,591 B2
(45) Date of Patent: Nov. 3, 2015

(54) FOCUS CONTROLLING METHOD AND OPTICAL DISK DRIVE USING THE FOCUS CONTROLLING METHOD

(75) Inventor: Kwan-ho Chun, Seoul (KR)

(73) Assignee: Toshiba Samsung Storage Technology Korea Corporation, Suwon-si (KR)

(*) Notice: Subject to any disclaimer, the term of this patent is extended or adjusted under 35 U.S.C. 154(b) by 498 days.

(21) Appl. No.: 12/230,535

(22) Filed: Aug. 29, 2008

(65) Prior Publication Data

US 2009/0067299 A1   Mar. 12, 2009

(30) Foreign Application Priority Data

Sep. 10, 2007 (KR) .................. 10-2007-0091611

(51) Int. Cl.
- G11B 7/00 (2006.01)
- G11B 7/085 (2006.01)
- G11B 7/1392 (2012.01)

(52) U.S. Cl.
CPC ........ *G11B 7/08511* (2013.01); *G11B 7/13925* (2013.01); *G11B 2007/0013* (2013.01)

(58) Field of Classification Search
CPC .............................. G02B 27/0025; G11B 7/00
See application file for complete search history.

(56) References Cited

U.S. PATENT DOCUMENTS

| | | | |
|---|---|---|---|
| 2001/0055256 A1* | 12/2001 | Ueki ........................ | 369/53.23 |
| 2004/0228232 A1* | 11/2004 | Takahashi et al. ......... | 369/44.26 |
| 2005/0243674 A1* | 11/2005 | Hirai ....................... | 369/53.23 |
| 2006/0181985 A1* | 8/2006 | Komma et al. ............ | 369/47.39 |
| 2006/0198259 A1* | 9/2006 | Yumita ..................... | 369/44.28 |
| 2008/0089193 A1* | 4/2008 | Kim et al. ................. | 369/44.27 |
| 2008/0181062 A1* | 7/2008 | Kim et al. ................. | 369/44.28 |
| 2009/0034399 A1* | 2/2009 | Hosokawa et al. ....... | 369/112.23 |

FOREIGN PATENT DOCUMENTS

| | | |
|---|---|---|
| JP | 2003-022545 | 1/2003 |
| JP | 2005-285294 | 10/2005 |
| KR | 1020030096123 | 12/2003 |
| KR | 1020050016276 | 2/2005 |
| KR | 1020050088040 | 9/2005 |
| KR | 1020060106882 | 10/2006 |
| KR | 1020070022635 | 2/2007 |

OTHER PUBLICATIONS

Korean Office Action issued on Aug. 14, 2008 in corresponding Korean patent application No. 10-2007-0091611.

* cited by examiner

*Primary Examiner* — Srilakshmi K Kumar
*Assistant Examiner* — Carl Adams
(74) *Attorney, Agent, or Firm* — NSIP Law

(57) ABSTRACT

An apparatus and method control a disk drive servo, and more particularly, an apparatus and method control a servo when moving between layers of a disk in a multi-layered disk drive. A focus controlling method, as an example of the servo controlling method, includes the operations of performing aberration correction according to a change of a recording layer of a disk from a currently accessed recording layer to a recording layer desired to be accessed, and changing the value of a parameter set that determines characteristics of signals for use in servo control of an optical disk drive, according to an aberration correction amount that is used during the aberration correction.

30 Claims, 13 Drawing Sheets

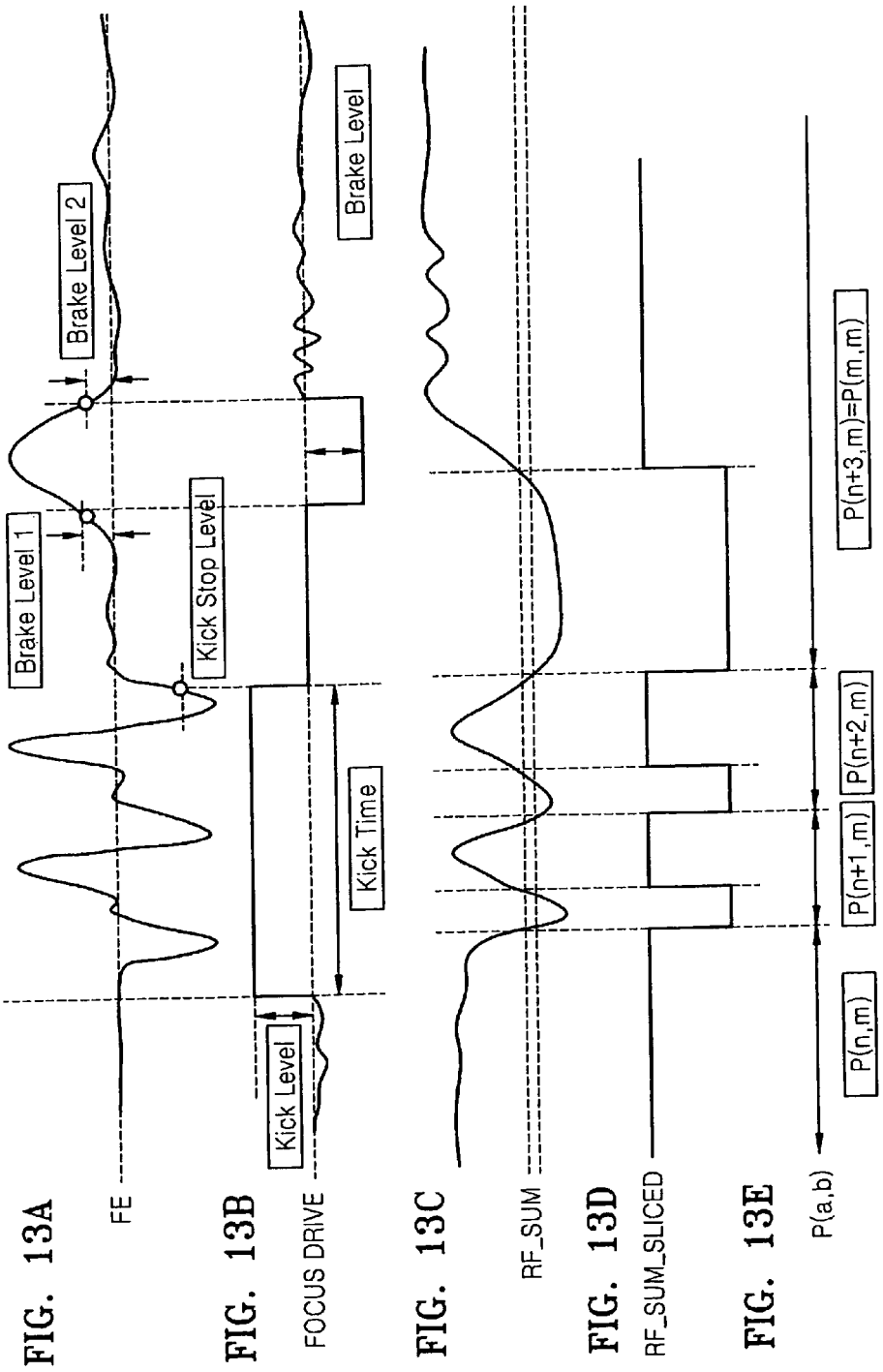

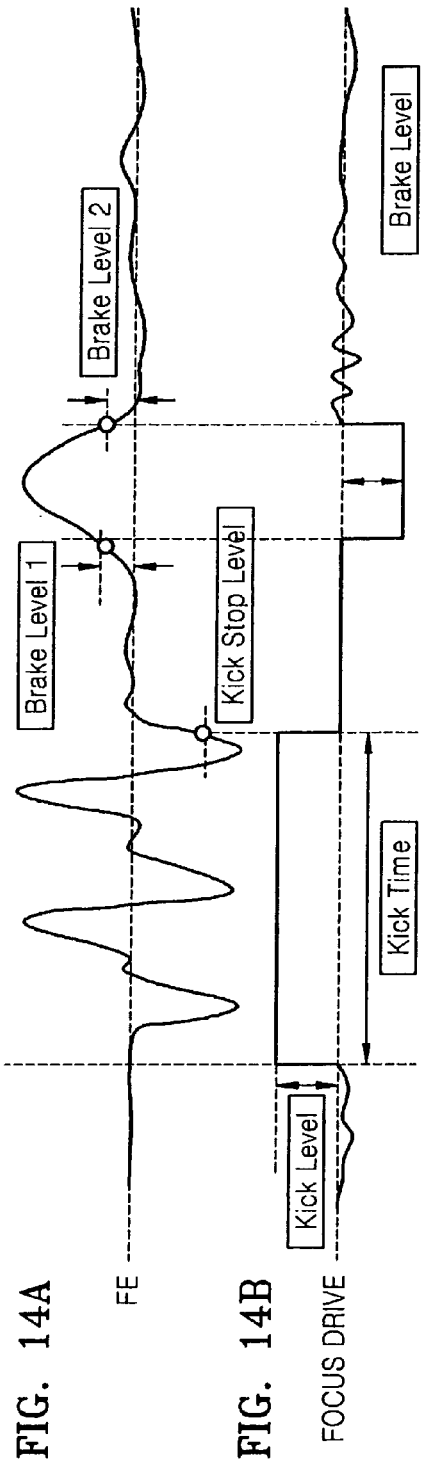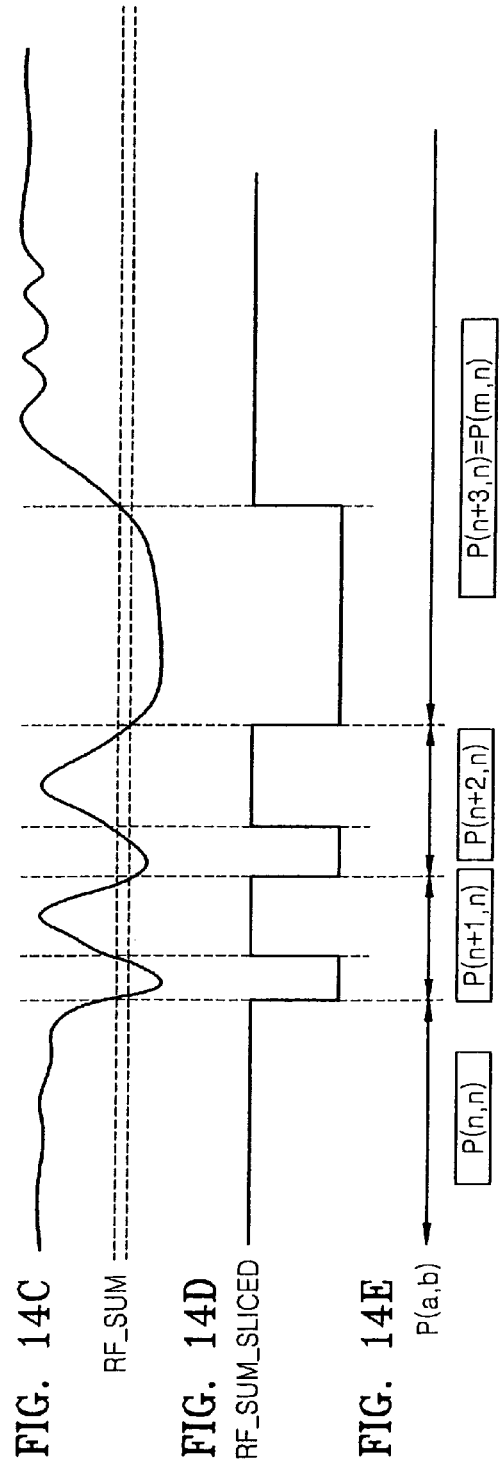
FIG. 14A
FIG. 14B
FIG. 14C
FIG. 14D
FIG. 14E

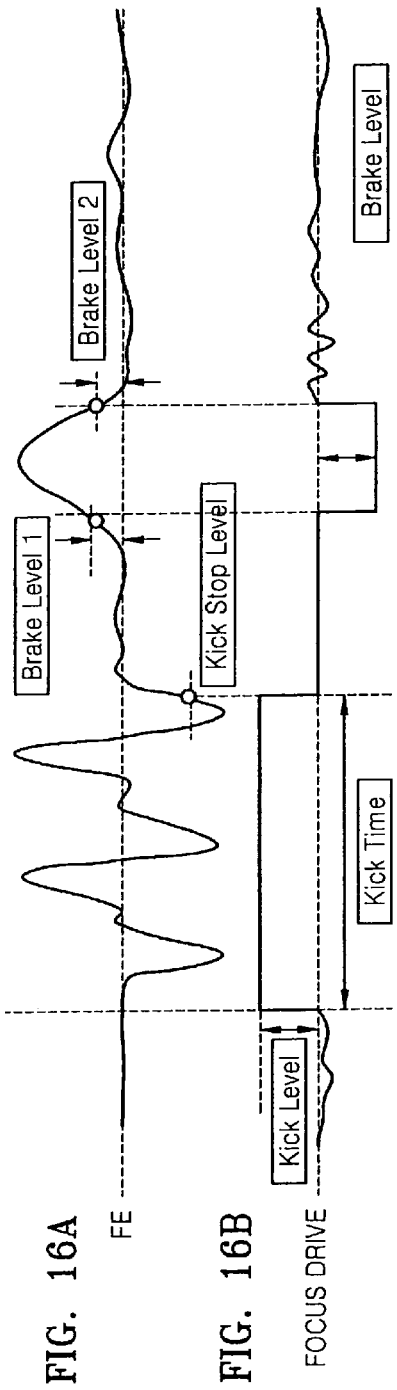

FOCUS CONTROLLING METHOD AND OPTICAL DISK DRIVE USING THE FOCUS CONTROLLING METHOD

CROSS-REFERENCE TO RELATED APPLICATIONS

This application claims the benefit of Korean Patent Application No. 10-2007-0091611, filed on Sep. 10, 2007, in the Korean Intellectual Property Office, the disclosure of which is incorporated herein in its entirety by reference.

BACKGROUND

1. Field

The present invention relates to an apparatus and method for controlling a disk drive servo, and more particularly, to an apparatus and method for controlling a servo when moving between layers of a multi-layered disk.

2. Description of the Related Art

Generally, optical disks, which are used as storage media of optical disk drives, can be classified as reproduction-only optical disks such as Compact Disc-read only memory (CD-ROM), writable-once optical disks such as Compact Disc-recordable (CD-R), and rewritable optical discs such as Compact Disc-rewritable (CD-RW), according to use purposes. These various types of disks have specific usage purposes and are widely used. With the development of large-storage capacity disks such as Digital Versatile Discs (DVDs), optical disks are being developed into media functioning as peripheral devices of PCs, for recording not only PC data but also a variety of video and/or audio data.

In particular, research into optical disk drives using multi-layered disks has been conducted in order to increase a data storage capacity of the optical disk. In particular, research into high-density multi-layered optical disk drives that use blue rays and relatively large numerical apertures (NA) has been actively conducted.

A spherical aberration caused by an error to the thickness of layer of an optical disk is proportional to NA to the power of 4. In particular, in the case of high-density disks using blue rays (Blue-Ray Discs), an error in the thickness of a protective layer, even if the absolute value of the thickness error is very small, causes a spherical aberration, which is not negligible. Thus, most high-density optical disk drives use spherical aberration correction units.

Spherical aberration correcting techniques are disclosed in Korean Patent Publication No. 2006-106882 and Japanese Patent Publication No. 2003-22545.

According to the conventional art, when there is a need for a layer jump in a multi-layered optical disk drive, generation timings of signals (e.g., a kick signal and a brake signal) required to move an objective lens of a pickup of an optical disk in order to focus light on a target layer are determined by referring to a focus error signal. When a spherical aberration is not accurately corrected, the magnitude of the focus error signal is changed, and the waveform thereof is distorted. Accordingly, while a spherical aberration correction unit is being driven or the objective lens is moving in order to achieve a layer jump, the focus error signal is distorted, and thus errors are highly likely to occur in the generation timings of the kick signal and the brake signal. Moreover, during driving of a spherical aberration corrector, servo control is unstable even with relatively small external disturbance due to a difference between a spherical aberration amount and a layer on which a beam is currently focused.

SUMMARY

The present invention provides a focus controlling method for performing a stable servo control while a spherical aberration correction unit is being driven, and accurately detecting the number of layers through which a beam passes while an objective lens is moving, so that layer jump in a multi-layered disk is achieved.

The present invention also provides an optical disk drive for performing a stable servo control while a spherical aberration correction unit is being driven or while an objective lens is moving, in order to achieve layer jump in a multi-layered disk.

According to an aspect of the present invention, a focus controlling method comprises the operations of: performing aberration correction according to a change of a recording layer of a disk from a currently accessed recording layer to a recording layer desired to be accessed; and changing the value of a parameter set that determines characteristics of signals for use in servo control of an optical disk drive, according to an aberration correction amount that is used during the aberration correction.

The aberration correction may comprise spherical aberration correction.

The parameter set value may be changed each time a square wave pulse of an aberration correction driving signal that is generated for the aberration correction is generated.

The parameter set value may be linearly changed according to the number of square wave pulses of an aberration correction driving signal that is generated for the aberration correction.

The parameter set may comprise parameters that determine characteristics associated with the generation of a sum signal obtained by summing signals detected by an optical detector of a pickup and the generation of a focus error signal.

The parameter set may comprise at least one of a plurality of parameters that determine a gain of the sum signal, a gain of the focus error signal, and a balance of the focus error signal.

The operation of changing the parameter set value may be an operation of changing the parameter set value according to the aberration correction amount by referring to a lookup table that comprises parameter set values optimized according to the amounts of aberration correction between the recording layer currently being accessed and the recording layer desired to be accessed by focus jumping.

According to another aspect of the present invention, there is provided a focus controlling method comprising the operations of: performing aberration correction corresponding to the recording layer desired to be accessed, according to an layer jump command; changing the value of a parameter set that determines characteristics of signals for use in servo control of the optical disk drive, according to an aberration correction amount that is used during the aberration correction; checking the number of recording layers of the disk to which the focal point of the optical signal emitted from the pickup of the optical disk drive has moved, by using a signal produced by processing signals detected by the pickup, and simultaneously moving the focal point of the optical signal emitted from the pickup to the recording layer desired to be accessed, after the aberration correction; and while the focal point of the optical signal is being moved, changing the parameter set value to adapt to each recording layer to which the recording layer to be accessed has been changed from a currently accessed recording layer.

According to another aspect of the present invention a focus controlling method comprises the operations of: checking the number of recording layers of the disk to which a focal point of an optical signal emitted from a pickup of an optical disk drive has moved, by using a signal produced by processing signals detected by the pickup, and simultaneously moving the focal point of the optical signal emitted from the pickup to the recording layer desired to be accessed, according to a layer jump command; while the focal point of the optical signal is being moved, changing the value of a parameter set that determines characteristics of signals for use in servo control of the optical disk drive, so as to adapt to each recording layer to which the recording layer desired to be accessed has been changed from the currently accessed recording layer; performing aberration correction corresponding to the recording layer to which the focal point of the optical signal emitted from the pickup has moved, after the focal point of the optical signal has been completely moved; and changing the parameter set value according to an aberration correction amount that is used during the aberration correction.

According to another aspect of the present invention, a focus controlling method comprises the operations of: checking the number of recording layers of the disk to which a focal point of an optical signal emitted from a pickup of an optical disk drive has moved, by using a signal produced by processing signals detected by the pickup, and simultaneously moving the focal point of the optical signal emitted from the pickup to the recording layer desired to be accessed, according to a layer jump command; and while the focal point of the optical signal is being moved, changing an aberration correction value and a parameter set value that determines characteristics of signals for use in servo control of the optical disk drive, so as to adapt to each recording layer to which the recording layer desired to be accessed has been changed from the currently accessed recording layer.

According to another aspect of the present invention, an optical disk drive comprises: a disk having a plurality of recording layers; a pickup projecting an optical signal to the disk via an objective lens and detecting an optical signal reflected from the disk, the pickup comprising an actuator and an aberration corrector, wherein the actuator moves the objective lens according to a focusing control signal and the aberration corrector corrects an aberration according to an aberration correction control signal; a controller generating the focusing control signal for controlling the location of the focal point of an optical signal emitted from the pickup in a focus jump mode, generating the aberration correction control signal corresponding to a change of a recording layer of the disk from a currently accessed recording layer to a recording layer desired to be accessed, and changing the value of a parameter set, which determines the characteristics of signals for use in servo control, according to the aberration correction control signal; and a signal processor processing signals detected by the pickup on the basis of the parameter set value.

The controller may generate the focusing control signal for moving the focal point of the optical signal emitted from the pickup to the recording layer desired to be accessed, after completing the aberration correction according to the aberration correction control signal generated corresponding to the recording layer desired to be accessed in a focus jump mode.

The controller may move the focal point of the optical signal emitted from the pickup to the recording layer desired to be accessed according to the focusing control signal in the focus jump mode and then generate an aberration correction control signal for aberration correction corresponding to the recording layer to which the focal point of the optical signal has been moved.

The controller may detect the number of recording layers of the disk to which the focal point of the optical signal has been moved, by using a signal for use in servo control generated by the signal processor, while moving the focal point of the optical signal emitted from the pickup according to the focusing control signal.

The controller may detect the number of recording layers of the disk to which the focal point of the optical signal has been moved, by counting the number of square wave pulses generated from a sum signal obtained by summing the signals detected by the pickup.

The controller may change the parameter set value to adapt to each recording layer to which the recording layer on which the focal point of the optical signal lands changes from a currently accessed recording layer, while the focal point of the optical signal emitted from the pickup is being moved in the focus jump mode.

While the focal point of the optical signal emitted from the pickup is being moved in the focus jump mode, the controller generates the aberration correction control signal and changes the parameter set value to adapt to each recording layer to which the recording layer on which the focal point of the optical signal lands changes from the currently accessed recording layer.

The controller may change the parameter set value according to an aberration correction amount by referring to a lookup table that comprises parameter set values optimized according to the amounts of aberration correction between the recording layer currently being accessed and the recording layer desired to be accessed by focus jumping.

Additional aspects and/or advantages will be set forth in part in the description which follows and, in part, will be apparent from the description, or may be learned by practice of the invention.

BRIEF DESCRIPTION OF THE DRAWINGS

The above and other features and advantages of the present invention will become more readily appreciated by describing in detail exemplary embodiments thereof with reference to the attached drawings in which:

FIGS. 13A through 13E are waveform diagrams of a variety of signals for describing a method of optimizing the values of parameters of a parameter set obtained after generation of a lens kick signal, when aberration correction is performed before a layer jump in a focus jump mode, according to an embodiment of the present invention;

FIGS. 14A through 14E are waveform diagrams of a variety of signals for describing a method of optimizing the values of parameters of a parameter set obtained after generation of a lens kick signal, when aberration correction is performed after a layer jump in a focus jump mode, according to an embodiment of the present invention;

FIGS. 16A through 16E are waveform diagrams of a variety of signals for describing a method of correcting an aberration correction value and the values of parameters of a parameter set during a layer jump in a focus jump mode, according to an embodiment of the present invention.

DETAILED DESCRIPTION OF EMBODIMENTS

Figure 1:
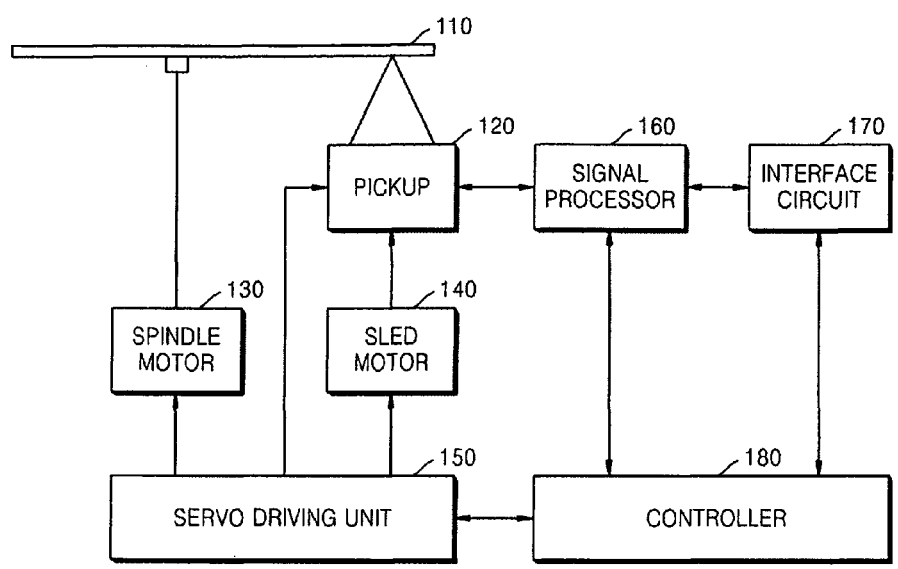
FIG. 1 is a block diagram of an optical disk drive according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram of an optical disk drive according to an embodiment of the present invention. Referring to FIG. 1, the optical disk drive according to the current embodiment of the present invention includes a disk 110, a pickup 120, a spindle motor 130, a sled motor 140, a servo driving unit 150, a signal processor 160, an interface circuit 170, and a controller 180.

Figure 3:
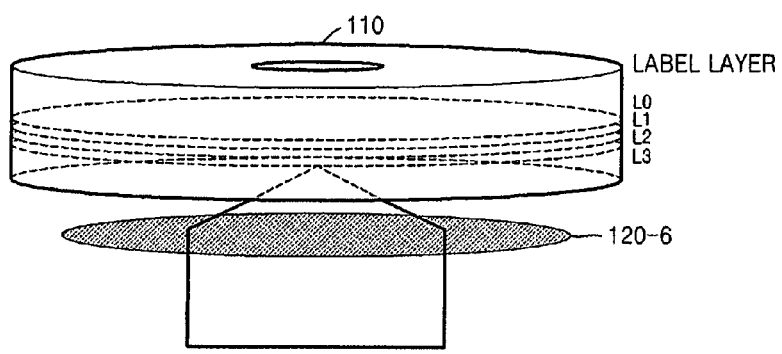
FIG. 3 illustrates a multi-layered disk used in the optical disk drive illustrated in FIG. 1, according to an embodiment of the present invention.

The disk 110 is a multi-layered disk. FIG. 3 illustrates the disk 110 according to an embodiment of the present invention. Referring to FIG. 3, the disk 110 according to the current embodiment is includes four layers, that is, recording layers L0 through L3 which can record data, and a label layer which does not record data and protects the recording layers L0 through L3.

Figure 2:
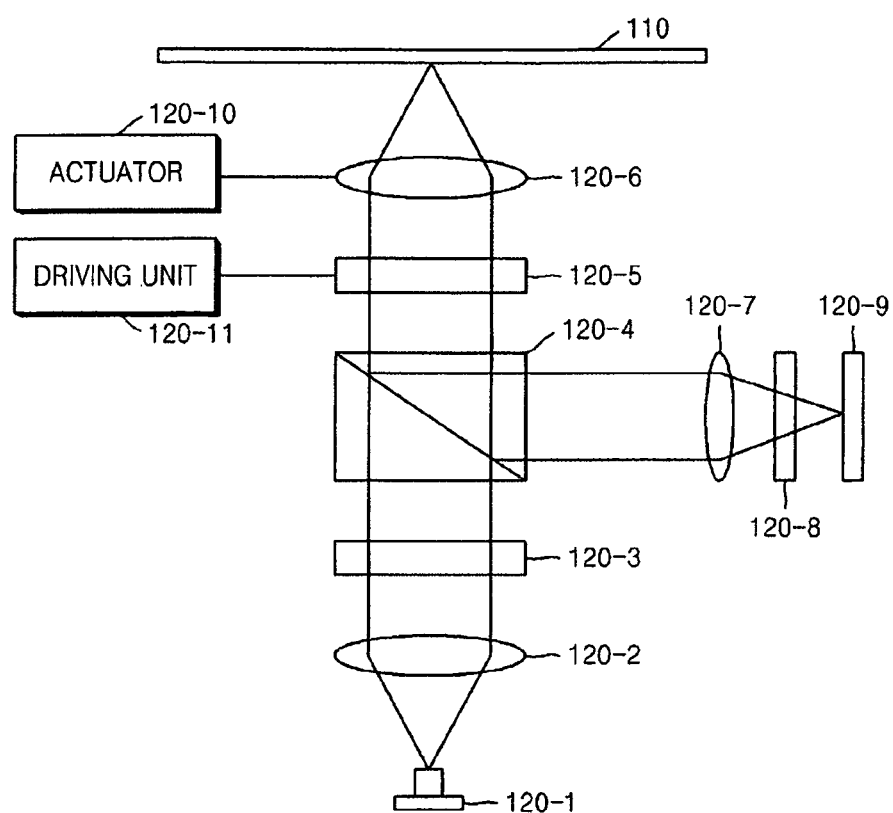
FIG. 2 is a detailed diagram of a pickup of the optical disk drive illustrated in FIG. 1, according to an embodiment of the present invention.

Referring back to FIG. 1, the pickup 120 projects an optical signal to the disk 110 and detects an optical signal reflected by the disk 110. FIG. 2 is a detailed diagram of the pickup 120, according to an embodiment of the present invention.

Referring to FIG. 2, the pickup 120 according to the current embodiment of the present invention includes a light source 120-1, a collimator lens 120-2, a diffraction grating 120-3, a polarization beam splitter 120-4, an aberration correction unit 120-5, an objective lens 120-6, a focusing lens 120-7, a multilens 120-8, an optical detector 120-9, an actuator 120-10, and a driving unit 120-11. The aberration correction unit 120-5 and the driving unit 120-11 together constitute an aberration corrector.

An optical signal emitted from the light source 120-1, such as a semiconductor laser, is irradiated to the collimator lens 120-2 which converts the optical signal into parallel light rays. In order to generate an error signal for servo control, the parallel light rays pass through the diffraction grating 120-3 for side spot generation, and are then incident upon the polarization beam splitter 1204. Then, the polarization beam splitter 1204 selects either S-wave light rays or P-wave light rays from the incident parallel light rays and emits the S-wave light rays or P-wave light rays to the aberration correction unit 120-5.

The aberration correction unit 120-5 denotes a unit for correcting a spherical aberration or a coma aberration. However, in the present embodiment, for convenience of explanation, the aberration correction unit 120-5 denotes a unit for correcting only spherical aberration. Of course, the present invention is not limited to this embodiment, and the aberration correction unit 120-5 may be designed to correct a variety of aberrations.

The aberration correction unit 120-5 for correcting spherical aberration, which is well known, may include a pair of a concave lens and a convex lens. In some cases, the aberration correction unit 120-5 is a liquid crystal device. When the aberration correction unit 120-5 includes a pair of a concave lens and a convex lens, it corrects spherical aberration by adjusting the interval between the concave lens and the convex lens.

In the present embodiment, spherical aberration is corrected by the convex and concave lenses, and the driving unit 120-11 controls the interval between the convex lens and the concave lens of the aberration correction unit 120-5.

The aberration-corrected S-wave light rays or P-wave light rays are incident upon the disk 110 via the objective lens 120-6.

Thereafter, the S-wave light rays or P-wave light rays incident upon the disk 110 are reflected by the disk 110 back to the objective lens 120-6, and are then incident upon the multi-lens 120-8 via the aberration correction unit 120-5, the polarization beam splitter 120-4, and the focusing lens 120-7.

The multi-lens 120-8 has a structure capable of detecting a focus error signal from the incident light by so-called astigmatism and a tracking error signal.

The optical detector 120-9 includes a plurality of photodiodes (not shown) arranged according to a structure required to generate a focus error signal and a tracking error signal. The photodiodes convert incident optical signals into electrical signals.

The actuator 120-10 performs focus control by vertically moving the objective lens 120-6 according to a focusing control signal, or performs tracking control by horizontally moving the objective lens 120-6 according to a tracking control signal.

Referring back to FIG. 1, the signal processor 160 generates a sum signal RF_SUM, a focus error signal FE, and a tracking error signal TE by processing the signals output by the optical detector 120-9 of the pickup 120, and performs a series of signal processing operations for restoring the data by processing the sum signal RF_SUM. The sum signal RF_SUM denotes a sum of all of the signals output by the optical detector 120-9.

The signal processor 160 includes amplification circuits and waveform shaping circuits in order to generate the sum signal RF_SUM, the focus error signal FE, and the tracking error signal TE that can be used in servo control and signal processing. The value of a parameter set for adjusting the gains of the amplification circuits, the balances of the waveform shaping circuits, and so on are determined by the controller 180.

The interface circuit 170 performs data processing for data transmission/reception with a host apparatus.

The controller 180 controls all of the components of the optical disk drive and performs a series of control operations of: generating a focusing control signal for controlling the movement of a focal point of an optical signal emitted by the pickup 120 in a focus jump mode for movement between layers of the disk 110; generating an aberration correction control signal corresponding to a change in a to-be-accessed recording layer in the disk 110, and changing a parameter set value according to the aberration correction control signal, wherein the parameter set value determines the characteristics of signals that are used for servo control. The controller 180 includes hardware and software for performing the methods illustrated in FIGS. 8 through 11. Detailed control operations of the controller 180 will be described later with reference to FIGS. 8 through 11.

The servo driving unit 150 generates driving signals for driving the spindle motor 130 and the sled motor 140, on the basis of a variety of control signals received from the controller 180. In addition, the servo driving unit 150 generates a driving signal for driving the actuator 120-10 of the pickup 120 in order to control focusing and tracking, and a driving signal for driving the driving unit 120-11 of the pickup 120 in order to control aberration correction.

The spindle motor 130 rotates the disk 110, and the sled motor 140 moves the pickup 120 over the disk 110.

Waveforms of a sum signal RF-SUM and a focus error signal FE, which were measured from the layers of a 4-layered disk after aberration correction values were suitably set for the layers, will now be described with reference to FIGS. 4 through 7.

Figure 4:
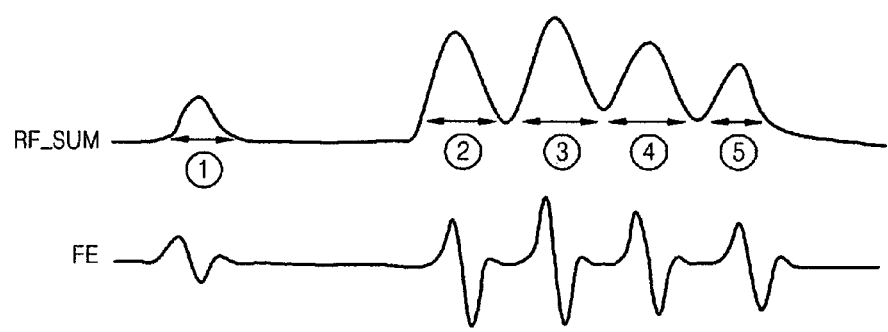
FIG. 4 illustrates waveforms of a signal RF_SUM and a signal FE that were measured from the four recording layers of a 4-layered disk for use in the present invention after an aberration corrector was set on a recording layer ②.

FIG. 4 illustrates waveforms of the sum signal RF_SUM and the focus error signal FE that were measured from the four recording layers of the 4-layered disk after an aberration corrector was adaptively set for a recording layer ②. The sum signal RF_SUM and the focus error signal FE in the recording layer ② have the largest magnitudes, and the focus error signal FE has good balance in the recording layer ②. Meanwhile, in a direction away from the recording layer ②, the magnitudes of the sum signal RF_SUM and the focus error signal FE decrease, and the waveform of the focus error signal FE is increasingly distorted to thereby increase balance distortion. For reference, a layer ① denotes a label layer which does not record data.

Figure 5:
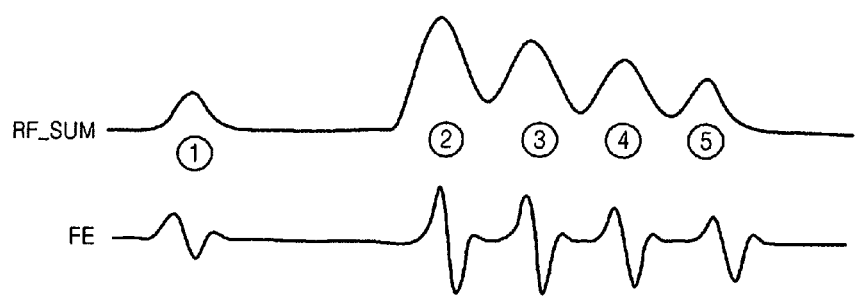
FIG. 5 illustrates waveforms of a signal RF_SUM and a signal FE that were measured from the four recording layers of the 4-layered disk after the aberration corrector was set on a recording layer ③.
Figure 6:
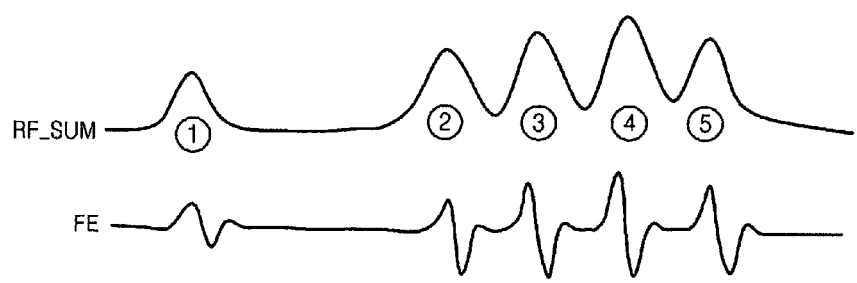
FIG. 6 illustrates waveforms of a signal RF_SUM and a signal FE that were measured from the four recording layers of the 4-layered disk after the aberration corrector was set on a recording layer ④.
Figure 7:
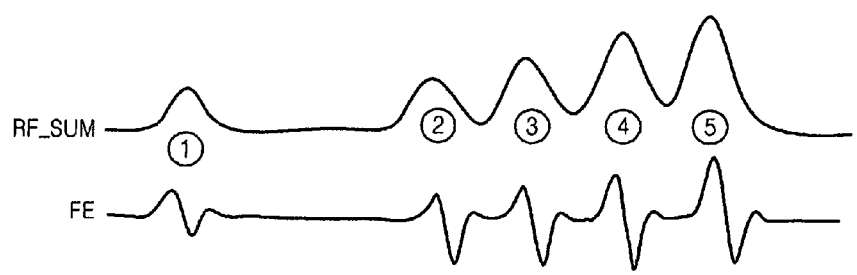
FIG. 7 illustrates waveforms of a signal RF_SUM and a signal FE that were measured from the four recording layers of the 4-layered disc after the aberration corrector was set on a recording layer ⑤.

Referring to FIGS. 5 through 7, similar to FIG. 4, a sum signal RF_SUM and a focus error signal FE have the largest magnitudes and the focus error signal FE has a good balance in a recording layer for which an aberration corrector was set, whereas in a direction away from the recording layer for which the aberration corrector was set, the magnitudes of the sum signal RF_SUM and the focus error signal FE decrease, and the waveform of the focus error signal FE is increasingly distorted.

In general, aberration correction is needed in a focus jump mode for movement between layers of a multi-layered disk. The stability of servo control decreases due to lack of gains of servo signals and distortions thereof caused during aberration correction. Consequently, servo control cannot be properly performed even with relatively small external disturbances.

In order to address this problem, the present invention has proposed a controlling method in which parameter values that determine characteristics related to the generation of signals required for servo control, including a sum signal RF_SUM and a focus error signal FE, are optimally changed according to aberration correction during the aberration correction.

In addition, generally, a layer jump in a focus jump mode for a movement between layers of a multi-layered disk is determined using a focus error signal FE, and the generation timings and pulse widths of a kick signal and a brake signal that are required for a focus jump operation are also determined using the focus error signal FE. However, unless the parameters for determining the characteristics related to the generation of the signals required for servo control are corrected while the actuator 120-10 of the pickup 120 is being driven, the number of layers through which light passes layers from the current to the target is not accurately detected. In a worst case event, servo control cannot be properly performed.

In order to address this problem, the present invention has proposed a controlling method in which parameter values that determine characteristics related to the generation of signals required for servo control, including a sum signal RF_SUM and a focus error signal FE, are optimally changed while a focal point of an optical signal emitted from the pickup 120 is moved according to an operation of the actuator 120-10 of the pickup 120.

The present invention has also proposed a method of detecting the number of recording layers, to which the focal point of the optical signal moves in a focus jump mode, by using the sum signal RF_SUM.

Figure 8:
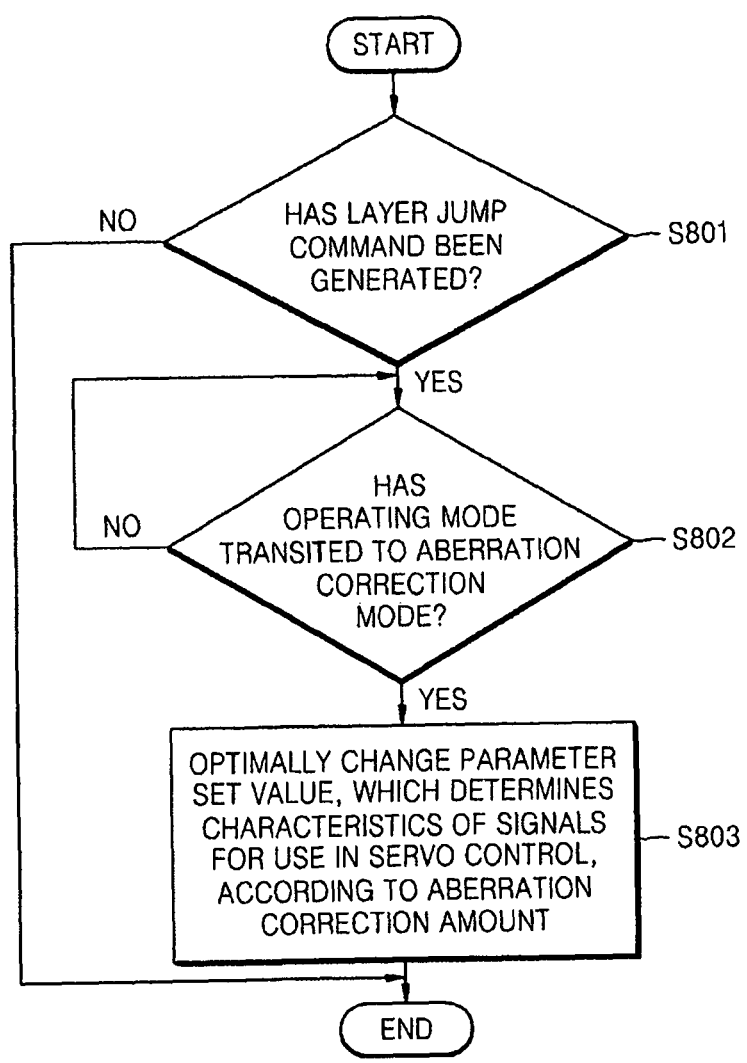
FIG. 8 is a flowchart of a focus controlling method according to an embodiment of the present invention.

A method, by which the values of parameters of a parameter set which determines the characteristics of signals for use in servo control are changed according to aberration correction by control of the controller 180, according to an embodiment of the present invention, will now be described with reference to FIG. 8. FIG. 8 is a flowchart of a focus controlling method performed on the optical disk drive illustrated in FIG. 1, according to an embodiment of the present invention Referring to FIG. 8, first, in operation S801, the controller 180 determines whether a layer jump command for changing a recording layer of the disk 110, which is to be accessed, has been generated.

If it is determined in operation 801 that the layer jump command has been generated, the controller 180 determines whether an operating mode has transited to an aberration correction mode, in operation S802. For reference, the optical disk drive including an aberration corrector performs aberration correction while the layer jump command is being performed. A point in time at which the aberration correction is performed according to the layer jump command may be determined so that the aberration correction can be performed before the actuator 120-10 of the pickup 120 is driven, or that the aberration correction can be performed after the actuator 120-10 of the pickup 120 is driven, or that the aberration correction can be performed every time a recording layer on which a beam is focused changes between interlayers.

In operation S803, when it is determined in operation 802 that the operating mode has transited to the aberration correction mode, the controller 180 optimally changes the value of a parameter set, which determines the characteristics of signals for use in servo control, according to an aberration correction amount. For example, the parameter set may include a parameter for determining the gain of the sum signal RF_SUM, a parameter for determining the gain of the focus error signal FE, and a parameter for determining the balance characteristics of the focus error signal FE.

The parameter set value may be designed to vary according to the number of times of generations of square wave pulses of an aberration correction driving signal, which is generated for aberration correction, whenever a spherical pulse is generated. In some cases, the parameter set value may be designed to linearly vary on the basis of a parameter set value which is generated every time a square wave pulse of the aberration correction driving signal is generated.

More specifically, the parameter set value may be designed to vary according to the amount of aberration correction by referring to a lookup table that includes parameter set values optimized according to the amounts of aberration correction between a recording layer currently being accessed and a recording layer to be subsequently accessed by focus jumping.

A series of control operations for performing a focus jump mode according to a layer jump command, according to an embodiment of the present invention, will now be described in greater detail.

Figure 9:
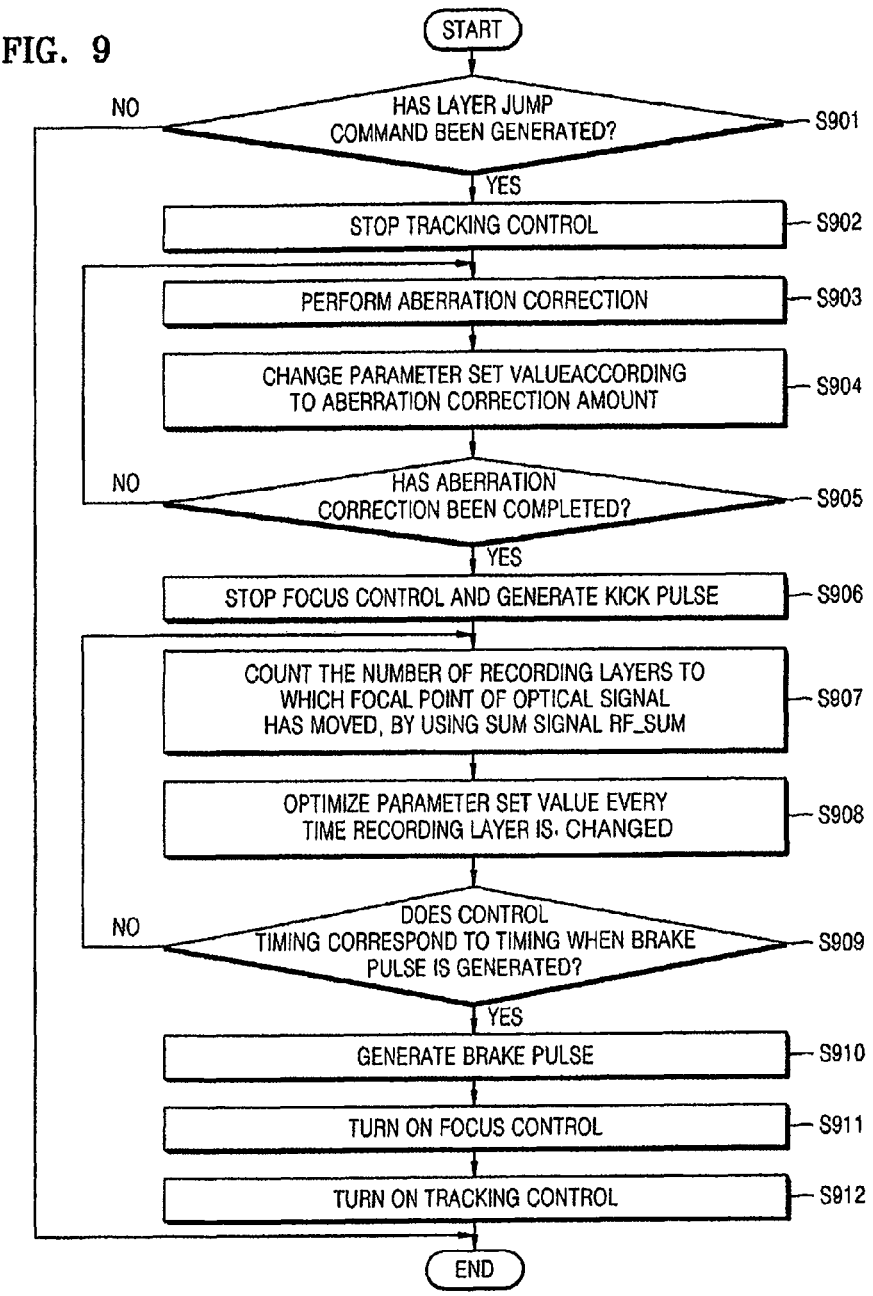
FIG. 9 is a flowchart of a focus controlling method according to another embodiment of the present invention.

First, a method of controlling a focus jump in a multi-layered disk according to an embodiment of the present invention will now be described with reference to FIG. 9. FIG. 9 is a flowchart of a focus controlling method performed on the optical disk drive illustrated in FIG. 1, according to another embodiment of the present invention.

Referring to FIG. 9 first, in operation S901, the optical disk drive determines whether a layer jump command for changing a recording layer of the disk 110, which is to be accessed, has been generated.

If it is determined in operation S901 that the layer jump command has been generated, the controller 180 stops tracking control in operation S902.

Thereafter, in operation S903, aberration correction suitable for a recording layer to which a beam desires to move from a recording layer being currently accessed is performed. Aberration correction values depending on layer jump are empirically determined when the optical disk drive is manufactured.

Next, in operation S904, while the aberration correction is being conducted, the value of a parameter set for determining the characteristics of signals for use in servo control is optimally changed according to the amount of aberration correction. For example, the parameter set may include a parameter for determining the gain of a sum signal RF_SUM, a parameter for determining the gain of a focus error signal FE, and a parameter for determining the balance feature of the focus error signal FE.

A layer of the disk 110 in which a current beam spot exists, is indicated by n, and a target layer of the disk 110 to which the current beam spot tries to move is indicated by m. A parameter value for determining the gain of the focus error signal FE when an aberration corrector existing in the layer "n" performs compensation corresponding to the layer "m" is defined by FE_GAIN(n,m), a parameter value for determining the balance of the focus error signal FE when the aberration corrector existing in the layer "n" performs compensation corresponding to the layer "m" is defined by FE_BAL(n, m), and a parameter value for determining the gain of the sum signal RF_SUM when the aberration corrector existing in the layer "n" performs compensation corresponding to the layer "m" is defined by RF_SUM_GAIN(n,m).

In this case, a parameter set value P(n,m) is calculated using Equation 1:

$$P(n,m)=\{FE\_GAIN(n,m), FE\_BAL(n,m), RF\_SUM\_GAIN(n,m)\} \quad \text{(Equation 1)}$$

It is assumed that an aberration correction value when the focal point of an optical signal emitted from the pickup 120 exists in the layer "n" and an aberration corrector performs a correction corresponding to the layer "m" is indicated by SA(n,m), and that an aberration correction value when an aberration corrector performs a correction corresponding to the layer "m" regardless of in which layer the current focal point exists is indicated by SA(m).

Figure 12A:
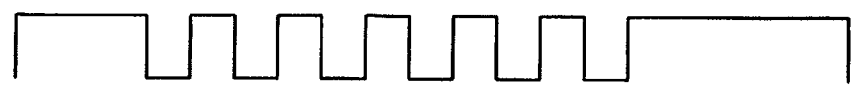
FIG. 12A illustrates an aberration correction driving signal.
Figure 12B:
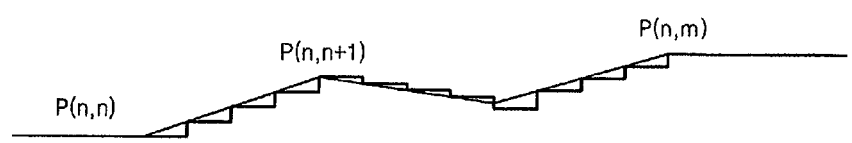
FIG. 12B illustrates a parameter set value that varies according to the aberration correction driving signal when aberration correction is performed before a layer jump in a focus jump mode, according to an embodiment of the present invention.

FIG. 12A illustrates an aberration correction driving signal generated according to a layer jump, and FIG. 12B illustrates a parameter set value that varies according to the aberration correction driving signal, according to an embodiment of the present invention.

Referring to FIGS. 12A and 12B, when a focus jump from the layer "n" to the layer "m" occurs, an aberration correction for the layer "m", which is a target layer to which the current focal point wants to move from the layer "n" is performed. The aberration correction driving signal may be designed as a square wave pulse signal. As illustrated in FIG. 12B, every time a square wave pulse is generated, the parameter set value may be changed by referring to a lookup table as described above. Of course, the parameter set value may be linearly changed using values read out from the lookup table.

In FIG. 12B, P(n,n) denotes a parameter set value which is optimized according to an aberration correction for the layer "n" when a beam spot exists in the layer "n", P(n,n+1) denotes a parameter set value which is optimized according to an aberration correction for a layer "n+1" when the beam spot exists in the layer "n", and P(n,m) denotes a parameter set value which is optimized according to an aberration correction for the layer "m" when the beam spot exists in the layer "n".

In this way, operation S904 can be performed.

Referring back to FIG. 9, while operation S904 is being performed, it is determined in operation S905 whether the aberration correction for the target layer has been completed.

If it is determined in operation S905 that the aberration correction has been completed, in operation S906, the focus control is stopped, and a kick pulse is then generated as a focus driving signal FOCUS DRIVE (shown in FIG. 13B) for moving the focal point of the optical signal emitted from the pickup 120 to the target layer and is applied to the actuator 120-10 of the pickup 120. Accordingly, the objective lens 120-6 of the pickup 120 starts moving toward the target layer. Referring to FIG. 13A, the width of a kick pulse is determined to be a time period from when the kick pulse is generated to when the focus error signal FE reaches a certain pre-determined level after occurrence of a number of S curves of the focus error signal FE corresponding to the number of layers for movement.

In operation S907, after the kick pulse is generated, the point in time at which a recording layer on which the optical signal emitted from the pickup 120 is focused is changed is detected using the sum signal RF_SUM, and the number of recording layers to which the focal point of the optical signal has moved is counted. For example, a square wave pulse signal RF_SUM_SLICED shown in FIG. 13D is generated by comparing the sum signal RF_SUM shown in FIG. 13C with two reference levels, and then it is determined that the recording layer has been changed when a falling edge of the square wave pulse signal RF_SUM_SLICED is generated. By counting the number of times falling edges of the square wave pulse signal RF_SUM_SLICED are generated, the number of recording layers to which the focal point of the optical signal emitted from the pickup 120 has moved is detected.

In operation S908, every time the recording layer is changed, a parameter set value for a target layer is optimized in a layer to which the recording layer has been changed, as shown in FIG. 13E. Before a kick pulse is generated, the parameter set value is optimized to P(n,m) in the layer "n" according to aberration correction, as described above with reference to operation S904. When the recording layer is changed from the layer "n" to a layer "n+1" according to a kick signal, the parameter set value is changed to P(n+1,m). When the target layer is (n+3) and the beam reaches the target layer, the parameter set value is changed to P(m,m).

In operation S909, it is determined whether a control timing corresponds to a timing when a brake pulse is generated after conclusion of a kick pulse duration. The brake pulse generation timing is a point in time at which the focus error signal FE reaches brake level 1 after the kick pulse duration is concluded, as shown in FIG. 13A.

If it is determined in operation S909 that the control timing corresponds to the brake pulse generation timing, the brake pulse is generated and applied to the actuator 120-10 of the pickup 120, in operation S910. The width of the brake pulse is determined to be a time period between when the brake pulse is generated and when the focus error signal FE reaches brake level 2, as shown in FIG. 13A.

In operation S911, after operation S910 is performed, a focus control is turned on in the target layer in order to execute focus servo control. Thereafter, in operation S912, a tracking control is turned on in order to perform tracking servo control.

Figure 10:
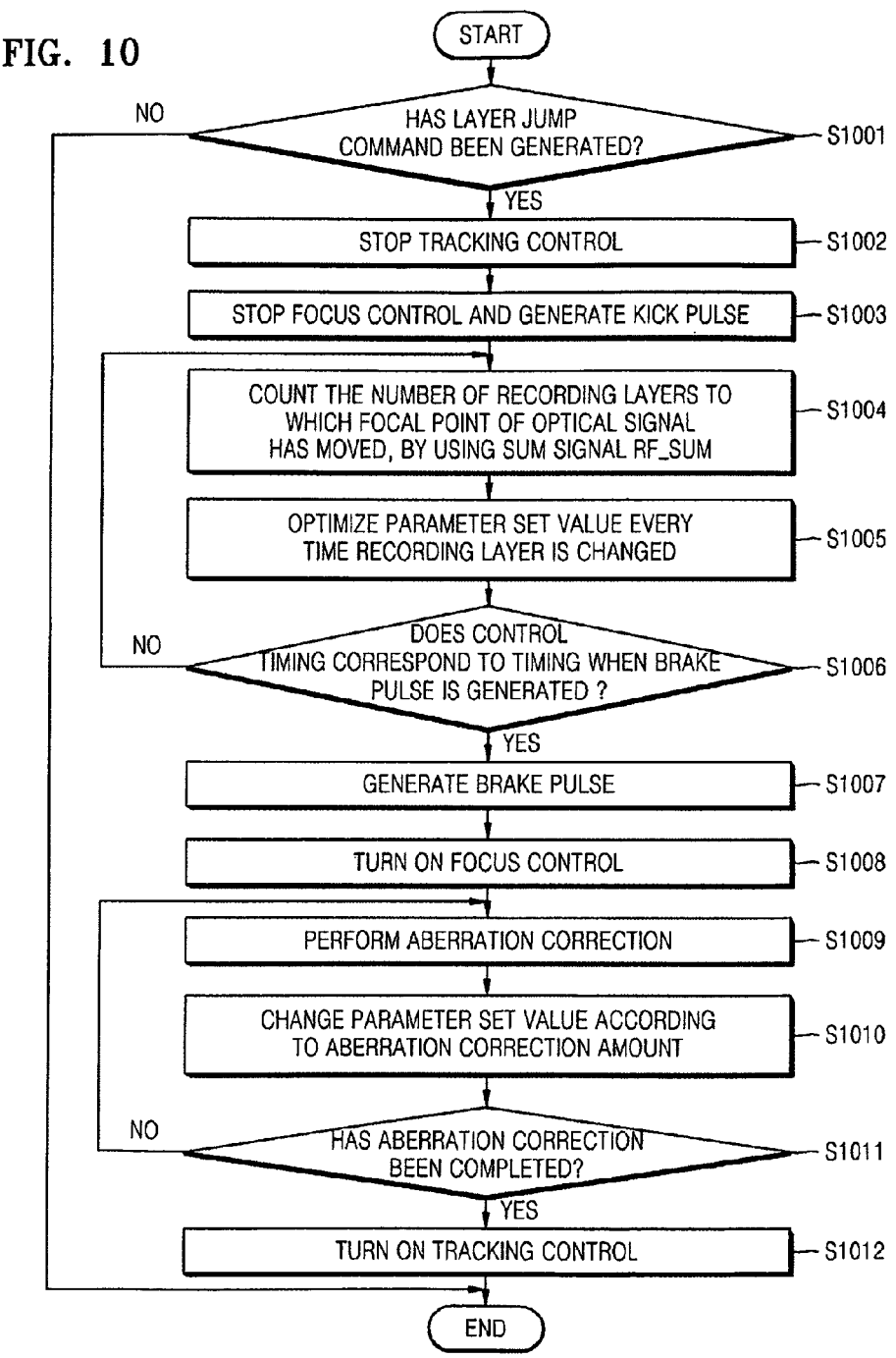
FIG. 10 is a flowchart of a focus controlling method according to another embodiment of the present invention.

Next, a method of controlling a focus jump in a multi-layered disk according to another embodiment of the present invention will be described with reference to FIG. 10. FIG. 10 is a flowchart of a focus controlling method performed on the optical disk drive illustrated in FIG. 1, according to another embodiment of the present invention For reference, the embodiment of FIG. 9 uses a method of performing aberration correction for a target layer, to which the beam is to move, before layer jump. Meanwhile, the embodiment of FIG. 10 uses a method of performing aberration correction for a target layer, to which the beam has been moved, after layer jump.

Accordingly, operations of the method of FIG. 10 technically the same as those of FIG. 9 will not be described herein.

Referring to FIG. 10, in operation S1001, it is determined whether a layer jump command for changing a recording layer of the disk 110, which is to be accessed by the optical disk drive, has been generated.

If it is determined in operation S1001 that the layer jump command has been generated, the controller 180 turns off tracking control in operation S1002.

In operation S1003, a focusing control is turned off, and a kick pulse is then generated as a focus driving signal (shown in FIG. 14B) for moving the focal point of the optical signal emitted from the pickup 120 to the target layer and is applied to the actuator 120-10 of the pickup 120. Accordingly, the objective lens 120-6 of the pickup 120 starts moving toward the target layer. The width of the kick pulse is determined using the same method as described above with reference to FIG. 9.

In operation S1004, after the kick pulse is generated, the point in time at which the recording layer on which the focal point of the optical signal emitted from the pickup 120 is to land is changed is detected using the sum signal RF_SUM, and the number of recording layers to which the focal point of the optical signal has been moved is counted. A method of detecting the point in time when the recording layer is changed and a method of counting the number of recording layers to which the focal point of the optical signal has been moved are the same as those described above with reference to FIG. 9.

Next, in operation S1005, every time the recording layer is changed, a parameter set value is optimized in a layer to which the recording layer has been changed, as shown in FIG. 14E. Since no aberration correction for the target layer has been performed before generation of the kick pulse, a parameter set value is optimized to P(n,n) in the layer "n". When the recording layer on which the focal point of the optical signal lands changes from the layer "n" to a layer "n+1" according to a kick signal, the parameter set value P(n,n) is changed to P(n+1,n). When the target layer is (n+3) and the focal point of the optical signal reaches the target layer, the parameter set value P(n+1,n) is changed to P(m,n).

In operation S1006, it is determined whether a control timing corresponds to a timing when a brake pulse is generated after conclusion of a kick pulse duration. A method of determining the brake pulse generation timing is the same as that described above with reference to FIG. 9.

If it is determined in operation S1006 that the control timing corresponds to the brake pulse generation timing, the brake pulse is generated and applied to the actuator 120-10 of the pickup 120 in operation S1007.

In operation S1008, after operation S1007 is performed, a focus control is turned on in the target layer in order to perform focus servo control.

Thereafter, in operation S1009, aberration correction suitable for the target layer to which the focal point of the optical signal has moved is performed. For example, an aberration correction driving signal may have square wave pulses as illustrated in FIG. 15A.

Next, in operation S1010, the parameter set value that determines the characteristics of signals for use in servo control is optimally changed according to an aberration correction amount during aberration correction.

Figure 15A:
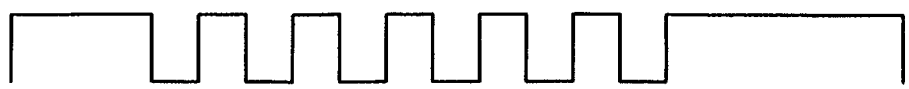
FIG. 15A illustrates an aberration correction driving signal.
Figure 15B:
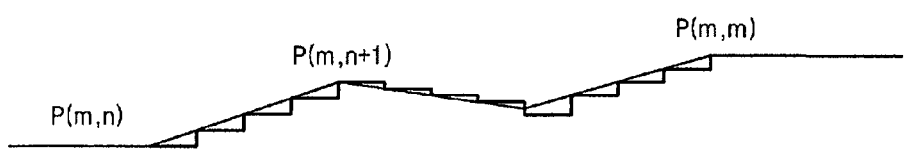
FIG. 15B illustrates a parameter set value that varies according to the aberration correction driving signal when aberration correction is performed after a layer jump in a focus jump mode, according to an embodiment of the present invention.

FIG. 15A illustrates the aberration correction driving signal and FIG. 15B illustrates the parameter set value that varies according to the aberration correction driving signal. Since the parameter set value has been changed to P(m,n) in the target layer according to layer jump in the operation S1005, the parameter set value in the target layer before aberration correction is P(m,n) as illustrated in FIG. 15B.

In FIG. 15B, P(m,n+1) denotes a parameter set value optimized in the layer "m" according to aberration correction for the layer "n+1", and P(m,m) denotes a parameter set value optimized in the layer "m" according to aberration correction for the layer "m".

Referring back to FIG. 10, in operation S1011, while operation S1010 is being performed, it is determined whether aberration correction for the target layer has been completed.

In operation S1012, when the aberration correction has been completed, tracking control is turned on in the target layer in order to perform tracking servo control.

Figure 11:
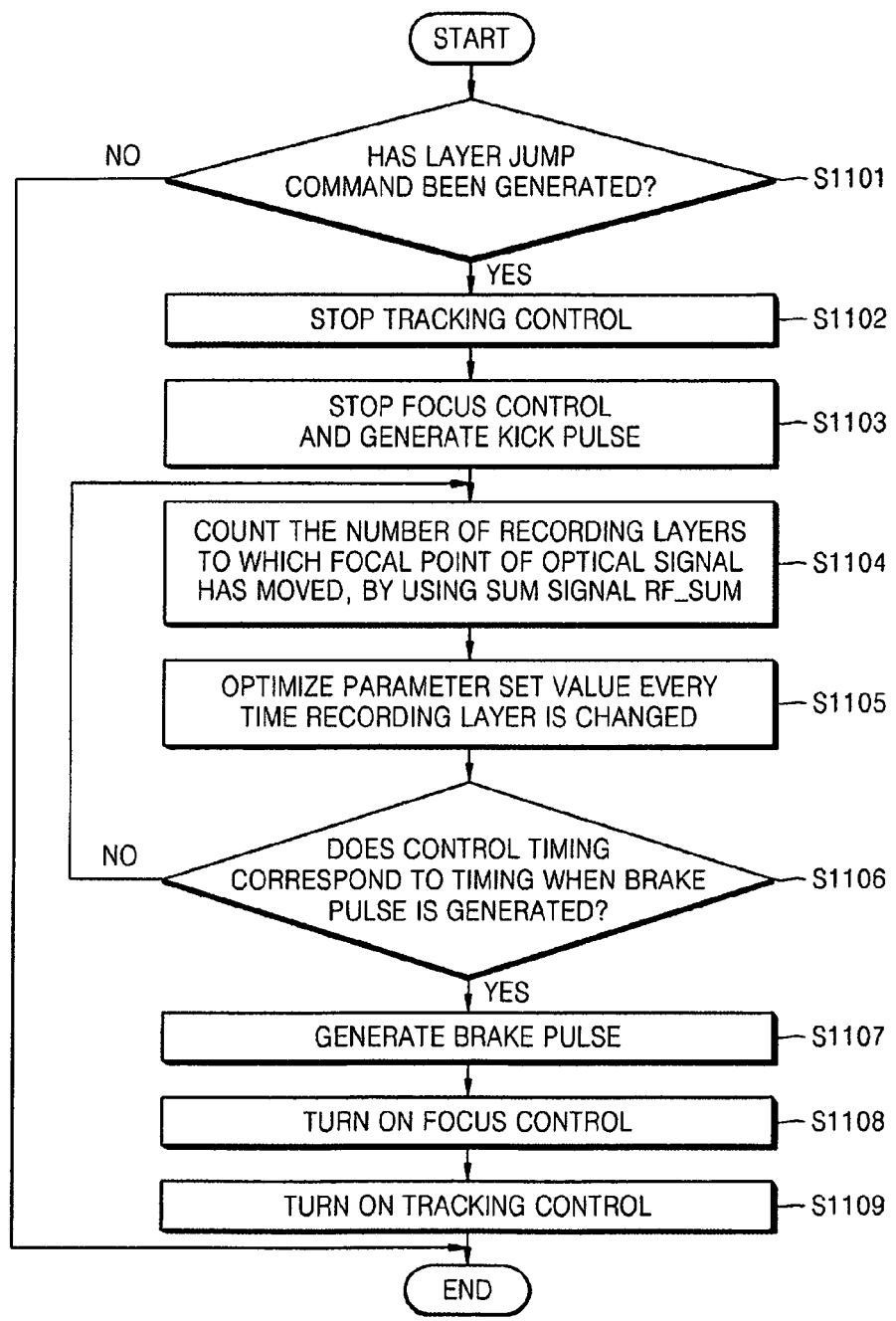
FIG. 11 is a flowchart of a focus controlling method according to another embodiment of the present invention.

Next, a method of controlling a focus jump in a multi-layered disk according to another embodiment of the present invention will now be described with reference to FIG. 11. FIG. 11 is a flowchart of a focus controlling method performed on the optical disk drive illustrated in FIG. 1, according to another embodiment of the present invention.

For reference, the embodiment of FIG. 9 uses a method of performing aberration correction for a target layer, to which a beam is to move, before layer jump, and the embodiment of FIG. 10 uses a method of performing aberration correction for a target layer, to which a beam has been moved, after layer jump. Meanwhile, the embodiment of FIG. 11 uses a method of optimizing an aberration correction value and a parameter set value whenever a recording layer on which a beam is focused changes, during layer jump.

Accordingly, operations of the method of FIG. 11 technically the same as those of FIG. 9 will not be described herein.

Referring to FIG. 11, in operation S101, it is determined whether a layer jump command for changing a recording layer of the disk 110, which is to be accessed by the optical disk drive, has been generated.

If it is determined in operation S1101 that a layer jump command has been generated, the controller 180 turns off tracking control in operation S1102.

In operation S1103, a focusing control is turned off, and a kick pulse is then generated as a focus driving signal (shown in FIG. 16B) for moving the focal point of the optical signal emitted from the pickup 120 to the target layer and is applied to the actuator 120-10 of the pickup 120. Accordingly, the objective lens 120-6 of the pickup 120 starts moving toward the target layer. The width of the kick pulse is determined using the same method as described above with reference to FIG. 9.

In operation S1104, after the kick pulse is generated, the point in time at which the recording layer on which the focal point of the optical signal emitted from the pickup 120 is to land is changed is detected using the sum signal RF_SUM, and the number of recording layers to which the focal point of the optical signal has been moved is counted. A method of detecting the point in time at which the recording layer is changed and a method of counting the number of recording layers to which the focal point of the optical signal has been moved are the same as those described above with reference to FIG. 9.

Next, in operation S1105, every time the recording layer is changed, an aberration correction value and a parameter set value are optimized in a layer to which the recording layer has been changed, as shown in FIG. 16E. A parameter set value and an aberration correction value before generation of the kick pulse are respectively P(n,n) and SA(n). When the recording layer on which the focal point of the optical signal lands changes from the layer "n" to a layer "n+1" according to a kick signal, the parameter set value P(n,n) is changed to P(n+1,n+1) and the aberration correction value is changed to SA(n). When the target layer is "n+3" and the focal point of the optical signal reaches the target layer "n+3", the parameter set value P(n+1,n+1) is changed to P(m,m) and the aberration correction value is changed to SA(m).

In operation S1106, it is determined whether a control timing corresponds to a timing when a brake pulse is generated after conclusion of a kick pulse duration. A method of determining the brake pulse generation timing is the same as that described above with reference to FIG. 9.

If it is determined in operation S1106 that the control timing corresponds to the brake pulse generation timing, the brake pulse is generated and applied to the actuator 120-10 of the pickup 120 in operation S1107.

In operation S1108, after operation S1107 is performed, a focus control is turned on in the target layer in order to perform focus servo control. Thereafter, in operation S1109, tracking control is turned on in the target layer in order to perform tracking servo control.

According to these operations, the values of the parameters of a parameter set can be optimally changed in order to perform stable aberration correction and stable servo control during a movement between layers of the multi-layered disk.

According to the present invention, parameter values for determining the characteristics of signals associated with servo control are optimized according to aberration correction, and the parameter values are optimized during layer jump by a focus jump. Therefore, stable servo control can be maintained even in the presence of external disturbance during aberration correction, and the number of layers through which a beam has passed can be accurately detected.

The present invention can be implemented as a method, an apparatus, and a system. When the present invention is implemented in software, its component elements are code segments that execute necessary operations. Programs or code segments can be stored in processor readable media and can be transmitted via a computer data signal that is combined with a carrier wave in a transmission medium or in a communication network. The processor readable medium can be any medium that can store or transmit data. Examples of the processor readable medium include electronic circuits, semiconductor memory devices, ROMs, flash memories, erasable ROMs (EROMs), floppy disks, optical disks, hard disks, optical fibers, radio frequency (RF) networks, etc. The computer data signal can be any signal that can be transmitted via transmission media, such as electronic network channels, optical fibers, air, an electronic field, RF networks, etc.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A focus controlling method comprising:
    performing aberration correction according to a change of a recording layer of a disk from a currently accessed recording layer to a recording layer desired to be accessed;
    changing a value of a gain of a sum signal, a gain of focus error signal, and/or a balance of the focus error signal based on an aberration correction amount that is used during the performing of the aberration correction operation between the currently accessed recording layer and the recording layer desired to be accessed; and
    determining characteristics of signals for use in servo control of an optical disk drive based on the gain of the sum signal, the gain of the focus error signal, and the balance of the focus error signal,
    wherein the changing of the value of the gain of the sum signal, the gain of the focus error signal, and/or the balance of the focus error signal comprises referring to a lookup table comprising the value of the gain of the sum signal, the gain of the focus error signal, and the balance of the focus error signal optimized based on the aberration correction amount between the currently accessed recording layer and the recording layer desired to be accessed.

2. The focus controlling method of claim 1, wherein the aberration correction comprises spherical aberration correction.

3. The focus controlling method of claim 1, wherein the gain of the sum signal, the gain of the focus error signal, and/or the balance of the focus error signal are changed in response to a square wave pulse of an aberration correction driving signal being generated for the aberration correction operation.

4. The focus controlling method of claim 1, wherein the gain of the sum signal, the gain of the focus error signal, and/or the balance of the focus error signal are linearly changed based on a number of square wave pulses of an aberration correction driving signal that is generated for the aberration correction operation.

5. The focus controlling method of claim 1, wherein the gain of the sum signal, the gain of the focus error signal, and/or the balance of the focus error signal determine characteristics associated with the generation of the sum signal obtained by summing signals detected by an optical detector of a pickup and the generation of the focus error signal.

6. The focus controlling method of claim 1, further comprising:
in response to the changing operation, changing a value of the gain of the sum signal, the gain of the focus error signal, and the balance of the focus error signal according to the desired recording layer so that the gain of the sum signal, the gain of the focus error signal, and the balance of the focus error signal is optimized to the recording layer desired to be accessed.

7. The focus controlling method of claim 1, wherein the changing of the value of the gain of the sum signal and the focus error signal in the recording layer desired to be accessed increases the value of the gain of the sum signal and the focus error signal in the recording layer desired to be accessed above a value of a gain of a sum signal and a focus error signal of layers away from the layer desired to be accessed.

8. The focus controlling method of claim 1, comprising generating a kick pulse as a focus driving signal that moves a focal point so that an objective lens is moved towards the recording layer desired to be accessed, wherein a width of the kick pulse is determined to be a time period from a generation of the kick pulse to the focus error signal reaching a predetermined level in response to an occurrence of a number of S curves of the focus error signal corresponding to a number of layers for movement.

9. The focus controlling method of claim 1, comprising
generating a square wave pulse signal by comparing the sum signal with two reference levels,
determining that the currently accessed recording layer has been changed in response to a falling edge of the square wave pulse signal being generated, and
counting a number of times that falling edges of the square wave pulse signal are generated to detect a number of recording layers to which a focal point of an optical signal emitted from a pickup has moved.

10. The focus controlling method of claim 1, comprising
determining whether a layer jump command is generated, and
determining whether an operating mode has made a transition to an aberration correction mode in order to determine whether the aberration correction is performed before an actuator of a pickup is driven, after the actuator of the pickup is driven, or automatically performed every time a recording layer on which a beam is focused changes.

11. A focus controlling method comprising:
performing aberration correction corresponding to a recording layer desired to be accessed, according to a layer jump command;
changing a value of a gain of a sum signal, a gain of a focus error signal, and/or a balance of the focus error signal based on an aberration correction amount that is used during the performing of the aberration correction operation;
checking a number of recording layers of an optical disk to which a focal point of an optical signal emitted from a pickup of the optical disk drive has moved, by using a signal produced by processing signals detected by the pickup, and simultaneously moving the focal point of the optical signal emitted from the pickup to the recording layer desired to be accessed, in response to the aberration correction;
changing the gain of the sum signal, the gain of the focus error signal, and/or the balance of the focus error signal to adapt to each of the recording layers from a currently accessed recording layer to the recording layer desired to be accessed; and
determining characteristics of signals for use in servo control of an optical disk drive based on the gain of the sum signal, the gain of the focus error signal, and/or the balance of the focus error signal,
wherein the changing of the value of the gain of the sum signal, the gain of the focus error signal, and/or the balance of the focus error signal comprises referring to a lookup table comprising the value of the gain of the sum signal, the gain of the focus error signal, and the balance of the focus error signal optimized based on the aberration correction amount between the currently accessed recording layer and the recording layer desired to be accessed.

12. The focus controlling method of claim 11, wherein the changing of the gain of the sum signal, the gain of the focus error signal, and/or the balance of the focus error signal according to the aberration correction amount comprises changing the gain of the sum signal, the gain of the focus error signal and/or the balance of the focus error signal in response to a square wave pulse of an aberration correction driving signal being generated for the aberration correction operation.

13. The focus controlling method of claim 11, wherein the number of recording layers to which the focal point of the optical signal has moved is detected by counting a number of square wave pulses generated from the sum signal obtained by summing the signals detected by an optical detector of the pickup.

14. The focus controlling method of claim 11, wherein the gain of the sum signal, the gain of the focus error signal, and/or the balance of the focus error signal determine characteristics associated with the generation of the sum signal obtained by summing the signals detected by an optical detector of the pickup and the generation of the focus error signal.

15. A focus controlling method comprising:
checking a number of recording layers of a disk to which a focal point of an optical signal emitted from a pickup of an optical disk drive has moved, by using a signal produced by processing signals detected by the pickup, and simultaneously moving the focal point of the optical signal emitted from the pickup to a recording layer desired to be accessed, according to a layer jump command;
changing the value of a gain of the sum signal, the gain of the focus error signal, and/or the balance of the focus error signal so as to adapt to each of the recording layers from a currently accessed recording layer to the recording layer desired to be accessed;
performing aberration correction corresponding to the recording layer to which the focal point of the optical signal emitted from the pickup has moved, in response to the focal point of the optical signal being completely moved;
changing the gain of the sum signal, the gain of the focus error signal, and/or the balance of the focus error signal based on an aberration correction amount that is used during the performing of the aberration correction operation; and determining characteristics of signals for use in servo control of the optical disk drive based on the gain of the sum signal, the gain of the focus error signal, and/or the balance of the focus error signal, wherein the changing of the value of the gain of the sum signal, the gain of the focus error signal, and/or the balance of the focus error signal comprises referring to a lookup table comprising the value of the gain of the sum signal, the gain of the focus error signal, and the balance of the focus error signal optimized based on the aberration correction amount between the currently accessed recording layer and the recording layer desired to be accessed.

16. The focus controlling method of claim 15, wherein the changing of the gain of the sum signal, the gain of the focus error signal, and/or the balance of the focus error signal according to the aberration correction amount comprises changing the gain of the sum signal, the gain of the focus in response to a square wave pulse of an aberration correction driving signal being generated for the aberration correction operation.

17. The focus controlling method of claim 15, wherein the gain of the sum signal, the gain of the focus error signal, and the balance of the focus error signal determine characteristics associated with the generation of the sum signal obtained by summing the signals detected by an optical detector of the pickup and the generation of the focus error signal.

18. A focus controlling method comprising:
checking a number of recording layers of a disk to which a focal point of an optical signal emitted from a pickup of an optical disk drive has moved, by using a signal produced by processing signals detected by the pickup, and simultaneously moving the focal point of the optical signal emitted from the pickup to a recording layer desired to be accessed, according to a layer jump command; and changing an aberration correction value and a gain of a sum signal, a gain of a focus error signal, and/or a balance of the focus error signal so as to adapt to each of the recording layers from a currently accessed recording layer to the recording layer desired to be accessed, wherein the changing of the gain of the sum signal, the gain of the focus error signal, and/or the balance of the focus error signal is based on an aberration correction amount that is used during the changing of the aberration correction value operation, between the currently accessed recording layer and the recording layer desired to be accessed; and determining characteristics of signals for use in servo control of the optical disk drive based on the gain of the sum signal, the gain of the focus error signal, and/or the balance of the focus error signal, wherein the changing of the value of the gain of the sum signal, the gain of the focus error signal, and/or the balance of the focus error signal comprises referring to a lookup table comprising the value of the gain of the sum signal, the gain of the focus error signal, and the balance of the focus error signal optimized based on the aberration correction amount between the currently accessed recording layer and the recording layer desired to be accessed.

19. An optical disk drive comprising:
a disk having recording layers;
a pickup configured to project an optical signal to the disk via an objective lens and detecting an optical signal reflected from the disk, the pickup comprising an actuator and an aberration corrector, wherein the actuator is configured to move the objective lens according to a focusing control signal and the aberration corrector is configured to correct an aberration based on an aberration correction control signal;

a controller configured to generate the focusing control signal to controlling the location of the focal point of an optical signal emitted from the pickup in a focus jump mode, generate the aberration correction control signal corresponding to a change of a recording layer of the disk from a currently accessed recording layer to a recording layer desired to be accessed, and change the value of a gain of a sum signal, a gain of a focus error signal, and/or a balance of the focus error signal, which determine the characteristics of signals for use in servo control, based on the generation of the aberration correction control signal operation;

a signal processor configured to process signals detected by the pickup on a basis of the gain of the sum signal, the gain of the focus error signal, and/or the balance of the focus error signal; and a lookup table comprising the value of the gain of the sum signal, the gain of the focus error signal, and the balance of the focus error signal optimized based on an aberration correction amount between the currently accessed recording layer and the recording layer desired to be accessed, wherein the gain of the sum signal, the gain of the focus error signal, and/or the balance of the focus error signal are associated with a thickness of the currently accessed recording layer and the recording layer desired to be accessed.

20. The optical disk drive of claim 19, wherein the gain of the sum signal, the gain of the focus error signal, and the balance of the focus error signal determine characteristics associated with the generation of the sum signal obtained by summing signals detected by the pickup and the generation of the focus error signal.

21. The optical disk drive of claim 19, wherein the controller is configured to generate the focusing control signal for moving the focal point of the optical signal emitted from the pickup to the recording layer desired to be accessed, in response to completing the aberration correction based on the generation of the aberration correction control signal operation corresponding to the recording layer desired to be accessed in a focus jump mode.

22. The optical disk drive of claim 19, wherein the controller is configured to move the focal point of the optical signal emitted from the pickup to the recording layer desired to be accessed according to the focusing control signal in the focus jump mode and generate an aberration correction control signal for aberration correction corresponding to the recording layer to which the focal point of the optical signal has been moved.

23. The optical disk drive of claim 19, wherein the controller is configured to detect a number of recording layers of the disk to which the focal point of the optical signal has been moved, by using a signal for use in servo control generated by the signal processor, while moving the focal point of the optical signal emitted from the pickup according to the focusing control signal.

24. The optical disk drive of claim 23, wherein the controller is further configured to detect a number of recording layers of the disk to which the focal point of the optical signal has been moved, by counting the number of square wave pulses generated from the sum signal obtained by summing the signals detected by the pickup.

25. The optical disk drive of claim 23, wherein the controller is configured to change the gain of the sum signal, the gain of the focus error signal, and/or the balance of the focus error signal to adapt to each of the recording layers to which a recording layer on which the focal point of the optical signal lands changes from the currently accessed recording layer, while the focal point of the optical signal emitted from the pickup is being moved in the focus jump mode.

26. The optical disk drive of claim 19, wherein, while the focal point of the optical signal emitted from the pickup is being moved in the focus jump mode, the controller is configured to generate the aberration correction control signal and changes the gain of the sum signal, the gain of the focus error signal, and/or the balance of the focus error signal to adapt to the each of the recording layers to which a recording layer on which the focal point of the optical signal lands changes from the currently accessed recording layer.

27. An optical disk drive comprising:
an aberration correction unit configured to perform aberration correction based on a change of a recording layer of a disk from a currently accessed recording layer to a recording layer desired to be accessed;
a parameter value changing unit configured to change a value of a gain of a sum signal, a gain of a focus error signal, and/or a balance of the focus error signal that determine characteristics of signals for use in servo control of an optical disk drive, based on an aberration correction amount that is used during the performing of the aberration correction operation between the currently accessed recording layer and the recording layer desired to be accessed; and
a lookup table comprising the value of the gain of the sum signal, the gain of the focus error signal, and the balance of the focus error signal optimized based on the aberration correction amount between the currently accessed recording layer and the recording layer desired to be accessed.

28. An optical disk drive comprising:
an aberration correction unit configured to perform aberration correction corresponding to a recording layer desired to be accessed, according to a layer jump command;
a parameter value changing unit configured to change a value of a gain of a sum signal, a gain of a focus error signal, and/or a balance of the focus error signal that determine characteristics of signals for use in servo control of an optical disk drive, based on an aberration correction amount that is used during the performing of the aberration correction operation;
a controlling unit configured to
check a number of recording layers of an optical disk to which a focal point of an optical signal emitted from a pickup of the optical disk drive has moved, by using a signal produced by processing signals detected by the pickup, and simultaneously moving the focal point of the optical signal emitted from the pickup to the recording layer desired to be accessed, after the aberration correction operation, and
change the value of the gain of the sum signal, the gain of the focus error signal, and/or the balance of the focus error signal, to adapt to each of the recording layers from a currently accessed recording layer to the recording layer desired to be accessed; and
a lookup table comprising the value of the gain of the sum signal, the gain of the focus error signal, and the balance of the focus error signal optimized based on the aberration correction amount between the currently accessed recording layer and the recording layer desired to be accessed.

29. An optical disk drive comprising:
a recording layer checking unit configured to check a number of recording layers of an optical disk to which a focal point of an optical signal emitted from a pickup of an optical disk drive has moved, by using a signal produced by processing signals detected by a pickup, and simultaneously move the focal point of the optical signal emitted from the pickup to a recording layer desired to be accessed, according to a layer jump command;
a servo control signal characteristic determiner configured to change a value of a gain of a sum signal, a gain of a focus error signal, and/or a balance of the focus error signal that determines characteristics of signals for use in servo control of the optical disk drive, so as to adapt to each of the recording layers from currently accessed recording layer to the recording layer desired to be accessed;
an aberration correction unit configured to perform aberration correction based on the recording layer to which the focal point of the optical signal emitted from the pickup has moved, after the focal point of the optical signal has been completely moved;
a parameter set value changer configured to change the value of the gain of the focus error signal, and the balance of the focus error signal optimized based on the aberration correction amount between the currently accessed recording layer and the recording layer desired to be accessed, wherein
the value of the gain of the sum signal, the gain of the focus error signal, and/or the balance of the focus error signal are associated with a thickness of the currently accessed recording layer and the recording layer desired to be accessed.

30. An optical disk drive comprising:
a recording layer checking unit configured to check a number of recording layers of an optical disk to which a focal point of an optical signal emitted from a pickup of an optical disk drive has moved, by using a signal produced by processing signals detected by the pickup, and simultaneously move the focal point of the optical signal emitted from the pickup to a recording layer desired to be accessed, according to a layer jump command;
an aberration correction value and parameter set value changer configured to change an aberration correction value and a gain of a sum signal, a gain of a focus error signal, and/or a balance of the focus error signal that determines characteristics of signals for use in servo control of the optical disk drive, so as to adapt to each of the recording layers from a currently accessed recording layer to the recording layer desired to be accessed, wherein the changing of the value of the gain of the sum signal, the gain of the focus error signal, and/or the balance of the focus error signal is based on an aberration correction amount that is used during the changing of the aberration correction value operation between the currently accessed recording layer and the recording layer desired to be accessed; and
a lookup table comprising the value of the gain of the sum signal, the gain of the focus error signal, and the balance of the focus error signal optimized based on the aberration correction amount between the currently accessed recording layer and the recording layer desired to be accessed.

* * * * *